(12) United States Patent
Kauppinen

(10) Patent No.: US 7,280,217 B2
(45) Date of Patent: Oct. 9, 2007

(54) INTERFEROMETER UTILIZING A ROTATING RIGID STRUCTURE

(75) Inventor: Jyrki Kauppinen, Ilmarinen (FI)

(73) Assignee: Noveltech Solutions Ltd., Ilmarinen (FI)

(*) Notice: Subject to any disclaimer, the term of this patent is extended or adjusted under 35 U.S.C. 154(b) by 355 days.

(21) Appl. No.: 10/508,151

(22) PCT Filed: Mar. 20, 2003

(86) PCT No.: PCT/FI03/00218

§ 371 (c)(1),
(2), (4) Date: Sep. 17, 2004

(87) PCT Pub. No.: WO03/078946

PCT Pub. Date: Sep. 25, 2003

(65) Prior Publication Data

US 2005/0179906 A1   Aug. 18, 2005

(30) Foreign Application Priority Data

Mar. 20, 2002   (FI) ............................. 20020530

(51) Int. Cl.
*G01B 9/02* (2006.01)
*G01J 3/45* (2006.01)
(52) U.S. Cl. .................................... 356/455
(58) Field of Classification Search ............. 356/451, 356/452, 455
See application file for complete search history.

(56) References Cited

U.S. PATENT DOCUMENTS

| 3,868,185 A | 2/1975 | Genzel |
| 4,383,762 A | 5/1983 | Burkert |
| 5,148,235 A * | 9/1992 | Tank et al. ............ 356/455 |
| 5,159,405 A | 10/1992 | Ukon |
| 5,309,217 A | 5/1994 | Simon et al. |
| 5,341,207 A * | 8/1994 | Tank et al. ............ 356/455 |
| 6,075,598 A | 6/2000 | Kauppinen |
| 2007/0097378 A1* | 5/2007 | Kauppinen ............ 356/450 |

FOREIGN PATENT DOCUMENTS

| DE | 37 36 694 | 6/1989 |
| DE | 88 14 391 | 6/1989 |
| DE | 4 005 491 | 8/1991 |
| EP | 0 314 103 | 5/1989 |

* cited by examiner

*Primary Examiner*—Patrick Connolly
(74) *Attorney, Agent, or Firm*—Paul Vincent

(57) ABSTRACT

The invention relates to an interferometer, comprising at least a beam splitter (10), an end mirror (11) for returning beams (S2, S3), and a set of mirrors (12, 13, 14, 15) for reflecting the beams (S2, S3) between the beam splitter (10) and the end mirror (11), at least some of said mirrors (12, 13, 14, 15) being mounted on a rigid structure (17) which is arranged to be rotatable around an axis (A). Said set of mirrors comprises at least one pair of planar mirrors, constituted by two plane mirrors (12, 13), and two angular mirrors (14, 15), constituted by plane mirrors and arranged to deflect a course of the beam (S2, S3) hitting the angular mirror (14, 15) and to direct the beams (S2, S3), guided from the beam splitter (10) by way of at least one pair of plane mirrors (12, 13) to the angular mirrors (14, 15), to the end mirror (11) and back to the beam splitter (10).

14 Claims, 2 Drawing Sheets

INTERFEROMETER UTILIZING A ROTATING RIGID STRUCTURE

This application is the national stage of PCT/FI03/00218 filed on Mar. 20, 2003.

BACKGROUND OF THE INVENTION

The invention relates to an interferometer as set forth in the preamble of the appended independent claim.

Many different interferometers are available. The simplest interferometer is a Michelson plane mirror interferometer, whose main components are a beamsplitter, a fixed mirror, and a movable mirror. A light beam hits the beamsplitter, whereupon part of the light beam passes through, reflects from the fixed mirror back to the beamsplitter and therefrom to a receiver, which can be, for example, a photocell or a human eye. Part of the light beam reflects from the beamsplitter to the movable mirror, from which it reflects back to the beamsplitter and further to the receiver. The beams incident on the receiver from the fixed and movable mirror interfere. If the distance from both mirrors to the beamsplitter is exactly equal, said distances include the same number of wavelengths of the applied light. If the movable mirror is moved closer to or further away from the beamsplitter, the receiver can register interference maxima the distance of which is half of the wavelength.

An interferometer is used e.g. for determining distances at a very high accuracy, for mapping roughnesses in various surfaces, as well as for determining a wavelength or wavelengths (spectra) in electromagnetic radiation.

The widest application range for interferometers is spectrometry. An important feature in spectrometric applications is the capability of moving a movable mirror at high precision without tilting the mirror. High precision motion has been pursued by developing so-called carousel interferometers, wherein the changing of optical path differences is performed in such a way that a carousel, constituted by pairs of mirrors mounted on a stationary structure, is rotated back and forth around an axis. Hence, this increases the optical path for one beam and decreases it for the other.

For example, patent publication U.S. Pat. No. 5,159,405 discloses an interferometer comprising a stationary beamsplitter, a rotatable pair of mirrors constituted by two plane mirrors, as well as a pair of mirrors constituted by two plane mirrors set at an angle relative to each other and returning the beams. A problem in the cited solution is its instability. Although the cited solution represents an implement with respect to prior art interferometers, such an instrument still has obvious faults. The principal reason for the inaccuracy of an interferometer as disclosed in the publication U.S. Pat. No. 5,159,405 is a long distance between the beamsplitter and the pair of mirrors returning the beams. Thus, when the base plate of an interferometer is subjected to deformation due to pressure and temperature variations, such that one edge thereof expands or contracts more than the other edge, or when the plate is subjected to torsional forces bending the opposite corners of the plate in different directions, the resulting measurement disturbances will be significant.

Patent publication U.S. Pat. No. 5,309,217 discloses a Fourier spectrometer comprising a beamsplitter, a rotatable pair of mirrors constituted by two cube-corner mirrors, as well as two fixed returning mirrors. The cited solution provides a compact configuration. However, a problem in the solution is the use of a cube-corner mirror consisting of three mirrors. In order to render the solution stable and fully functional in all circumstances, the angles between all mirrors included in cube-corner mirrors should be precisely 90°. If the angles deviate slightly from 90°, there will be six images, and a plane wave in the interferometer will be divided into six unequal-phase zones. The manufacture of a cube-corner mirror with all of its angles being precisely 90° is highly expensive, so the manufacturing costs for an instrument as disclosed in the cited publication are extremely high.

The earlier patent publication U.S. Pat. No. 6,075,598 of the applicant discloses a further developed carousel interferometer, wherein a beam reflected from a radiation source is divided by a beamsplitter into two individual beams. In addition, the interferometer described in U.S. Pat. No. 6,075,598 comprises one plane mirror for returning the beams, as well as two pairs of mirrors for reflecting the beamsplitter-emitted beams to said returning plane mirror and the beams returning therefrom further back to the beamsplitter. Said pairs of mirrors guiding the beams between the beamsplitter and the returning plane mirror are mounted on a rigid structure, a carousel, which is adapted to be rotatable around an axis. The solution disclosed in the publication U.S. Pat. No. 6,075,598 provides a highly stable structure, wherein the passage of beams cannot be affected by potential base plate deformations.

It has now been discovered that the solution disclosed in the publication U.S. Pat. No. 6,075,598 can be improved even further. In the solution set forth in U.S. Pat. No. 6,075,598 the mounting of a carousel to effect its rotation in an exactly horizontal position is difficult in some applications. In other words, it has been discovered that, in certain conditions, the rotation axis of a carousel has a tendency towards a slight tilt deviating from a precise vertical plane. If the axis and a carousel mounted thereon become tilted in the direction of a plane of a beamsplitter, the beams will be deflected, such that the end mirror will be hit by the latter either higher or lower and so will the beamsplitter by returning beams. In this case, the deflection of both beams occurs in the same direction, with no disturbance in the operation of the interferometer. However, if the axis and a carousel mounted thereon become tilted in a direction deviating from that of a plane of a beamsplitter, the deflections of beams occur in deviating directions and the operation of the interferometer may be disturbed.

Another present discovery is that one problem in the solution disclosed in U.S. Pat. No. 6,075,598 is its adjustment, which is performed by adjusting the beamsplitter. It has now become evident that the adjustment of a beamsplitter, i.e. the precise setting of its attitude and position, is practically difficult in some cases. One reason for the difficulty is e.g. that the beamsplitter is manufactured in such a soft material that it may deform or yield in the process of performing an adjustment with set screws.

Hence, it is an object of an interferometer of the present invention to obviate or at least alleviate problems caused by the above-stated prior art.

Another object of an interferometer of the present invention is to provide an accurate and highly stable interferometer, wherein the effect of potential trouble sources on measuring accuracy is eliminated or at least undermined.

A still further object of the present invention is to provide an interferometer, which is readily and precisely adjustable.

Still another object of an interferometer of the present invention is to provide a compact interferometer, which is capable of achieving a considerable change in an optical path difference with respect to external interferometer dimensions.

SUMMARY OF THE INVENTION

In order to achieve e.g. the above objectives, an interferometer of the invention is principally characterized by what is set forth in the characterizing clause of the appended independent claim.

In a typical interferometer of the present invention, the reflection of beams between a beamsplitter and an end mirror is effected by a set of mirrors, comprising at least one pair of plane mirrors constituted by two plane mirrors, and two angle mirrors constituted by plane mirrors, which are adapted to deflect the course of an angle-mirror hitting beam typically by about 145°-215°, preferably by about 170°-190°, and most preferably by 180°, and to direct the beams, which have been guided from the beamsplitter by way of at least one pair of plane mirrors to the angle mirrors, to the end mirrors and back to the beamsplitter.

The end mirror, used for returning the beams divided by the beamsplitter, is preferably implemented by a single continuous plane mirror, which is adapted to function as an end mirror for both beams. The end mirror can also be implemented by more than one plane mirror, but it is highly preferential that the plane surfaces of such end mirrors be exactly parallel to each other.

The most important benefit gained by an interferometer of the present invention is stability provided thereby, as the interferometer of the present invention is even able to tolerate minor declinations of the rotation axes of movably mounted mirrors from an exact vertical plane. In addition, the interferometer of the present invention is capable of achieving an optical path difference which exceeds that obtained by a solution as set forth for example in the publication U.S. Pat. No. 6,075,598, while the instrument has the same external dimensions. Thus, the interferometer of the present invention is capable of performing spectroscopic measurements at a higher resolution.

In one preferred interferometer of the present invention, the beamsplitter, the pair of plane mirrors, and the end mirror are mounted on a first rigid support structure, and the angle mirrors are mounted on a second rigid support structure adapted to be rotatable around an axis. It is highly preferred that the second rigid structure be attached to the first rigid structure and pivotably relative thereto. This provides a particularly good interferometer stability, since potential distortions in the base of an interferometer do not affect the passage of beams.

In one preferred interferometer of the present invention, at least one of the angle mirrors, preferably both, are comprised of two plane mirrors, between which is provided an angle typically of about 72-107, preferably of about 85-95, and most preferably of 90°. The angle mirror can also be implemented by using more than two mirrors. The benefit of an angle mirror constituted by two plane mirrors over those constituted by a plurality of mirrors is its reasonable manufacturing costs, which are achieved e.g. by the fact that the angle mirrors manufactured and assembled from two plane mirrors are easier to design in such a way that the course of a beam incident thereon changes respectively, depending on an angle between the plane mirrors, typically by about 145°-215°, preferably by about 170°-190°, and most preferably by 180°, upon hitting the angle mirror. Advantageously, the plane mirrors constituting an angle mirror are linked to each other for example by means of a common support structure or frame.

In one preferred interferometer of the present invention, the plane mirrors of a pair of plane mirrors are arranged in such a way that beams coming from a beamsplitter to a pair of plane mirrors travel by way of angle mirrors and hit an end mirror in a substantially perpendicular direction, whereby the beams reflecting from the end mirror return along the same route by way of the angle mirrors and plane mirrors back to the beamsplitter. In other words, the plane mirrors of a pair of plane mirrors are assembled in such a way that the beams reflecting therefrom to angle mirrors are perpendicular to the plane of an end mirror, whereby the beams coming from the angle mirrors to the end mirror continue to be perpendicular to the end mirror. Due to this, among other things, the inventive interferometer is such that the hitting points of beams on mirrors are only slightly displaced as the attitude or angle of rotatably mounted angle mirrors changes.

In one preferred interferometer of the present invention, the end mirror has its mirror-forming plane surface arranged at a right angle relative to the plane surfaces of a beamsplitter, which enables a compact design and the courses of beams divided by the beamsplitter to be implemented as mirror images of each other for improving stability of the interferometer. Furthermore, it is highly preferred that the end mirror be set in the proximity of the beamsplitter for a compact interferometer design and even better stability.

In one preferred interferometer of the present invention, at least one of the plane mirrors included in a pair of plane mirrors is adapted to be movable for adjusting the interferometer. It is also conceivable that both plane mirrors of a pair of plane mirrors are adapted to be adjustable, but the adjustment of just one plane mirror, i.e. changing its attitude by turning and/or tilting, is sufficient for adjusting an interferometer of the present invention. In this case, the beamsplitter of the interferometer need not be adjusted at all, but the beamsplitter can be designed as a totally stationary element. Depending on a particular application, a more accurate adjustability may be achieved by the adjustment of a plane mirror than by the adjustment of a beamsplitter, since resetting the position of a hard-surface plane mirror is more secure than that of a brittle beamsplitter.

One highly preferred interferometer of the present invention is implemented in such a way that a beam to be delivered to the interferometer is conductible to a beamsplitter through between a first plane mirror and a first angle mirror, the beamsplitter being arranged to divide the beam into two beams, namely a first beam and a second beam, the first beam is arranged to be reflected from the beamsplitter to the first plane mirror, and to be perpendicularly reflected from the plane mirror further by way of the first angle mirror towards the beamsplitter to an end mirror, and to return from the end mirror over the same route back to the beamsplitter, the second beam is arranged to pass through the beamsplitter and to advance to a second plane mirror and to be reflected therefrom further by way of a second angle mirror towards the beamsplitter to the end mirror, and to return from the end mirror over the same route back to the beamsplitter, and that the beamsplitter is arranged to combine the first and second beam returning from the end mirror into a single beam and to direct the combined beam towards an interspace between the second plane mirror and the second angle mirror. This results in a highly compact design, which is capable of achieving a major change in an optical path difference by turning the angle mirrors. The described system has also a high stability.

In addition to the foregoing mirrors, one interferometer of the present invention comprises one or more of the following components: a rotation mechanism for rotating a second rigid structure comprised of angle mirrors at least partially around an axis, a light source, and a receiver. If desirable, the rotation mechanism enables the automation of a desired size angular variation for rotatably arranged mirrors, back and forth as desired. The light source enables the production of a desired type light beam to be emitted to the interferometer. The receiver enables the reception of the beams that have travelled in the interferometer.

The invention will now be described in more detail with reference to the accompanying drawing, in which

DESCRIPTION OF THE PREFERRED EMBODIMENT

Figure 1:
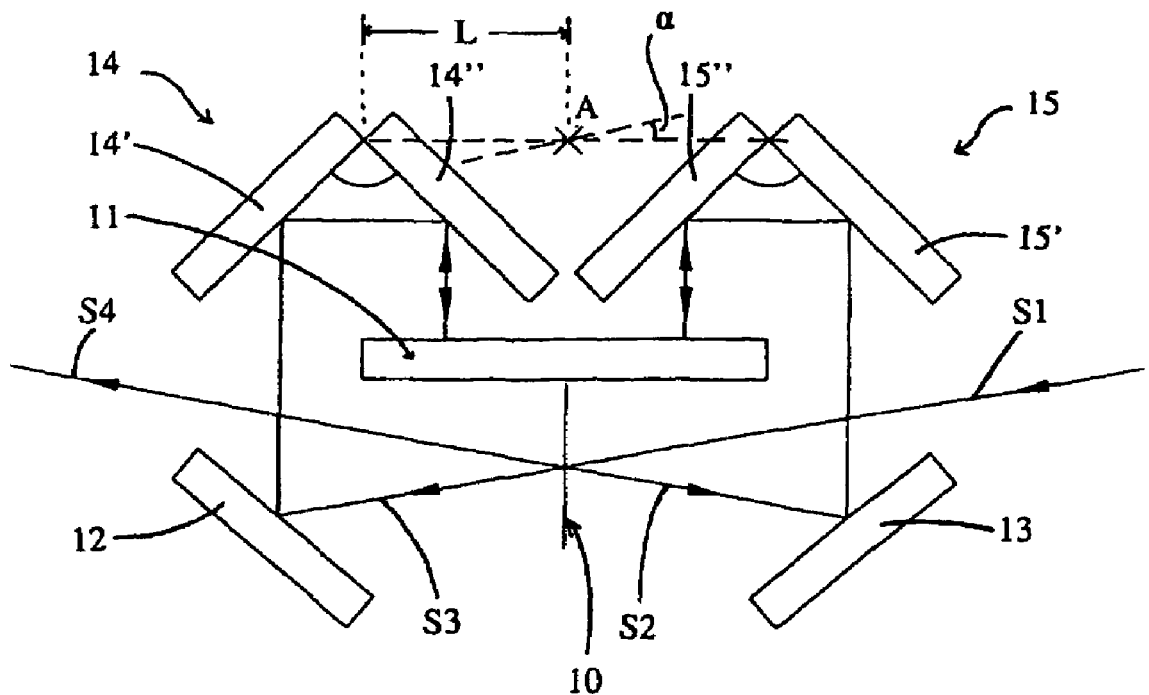
FIG. 1 shows schematically an optical layout for an interferometer according to one embodiment of the invention.

FIG. 1 illustrates schematically an optical layout in one embodiment for an interferometer of the present invention. As depicted in the figure, the interferometer comprises a beamsplitter 10 for dividing a beam S1, emitted for example from a radiation source (not shown in the figure), into two individual beams, i.e. a first beam S2, which has reflected from the beamsplitter, and a beam S3, which has progressed through the beamsplitter. In addition, the interferometer comprises an end mirror 11, constituted by a single integral plane mirror, for returning the beams S2 and S3. The beams S2 and S3 are reflected between the beamsplitter 10 and the end mirror by a set of mirrors, comprising a pair of mirrors, constituted by two plane mirrors 12 and 13 for reflecting the beams S2 and S3, and two angle mirrors 14 and 15. The angle mirrors 14 and 15 are constituted by two plane mirrors 14' and 14" as well as 15' and 15", respectively, mounted at a substantially right or 90° angle relative to each other. The beams S2 and S3, returning from the end mirror 11 by way of the angle mirrors 14 and 15 and the plane mirrors 12 and 13, are reassembled by the beamsplitter 10 for a single beam S4 which is conducted e.g. to a detector (not shown in the figure). As depicted in the figure, the beam S1 is guided to the beamsplitter 10 through between the plane mirror 13 and the angle mirror 15. As shown in the figure, the reassembled beam S4 is directed from the beamsplitter 10 towards an interspace between the plane mirror 12 and the angle mirror 14, from which the beam S4 can be conducted further for example to a detector or in which interspace an appropriate detector can be accommodated.

Figure 2:
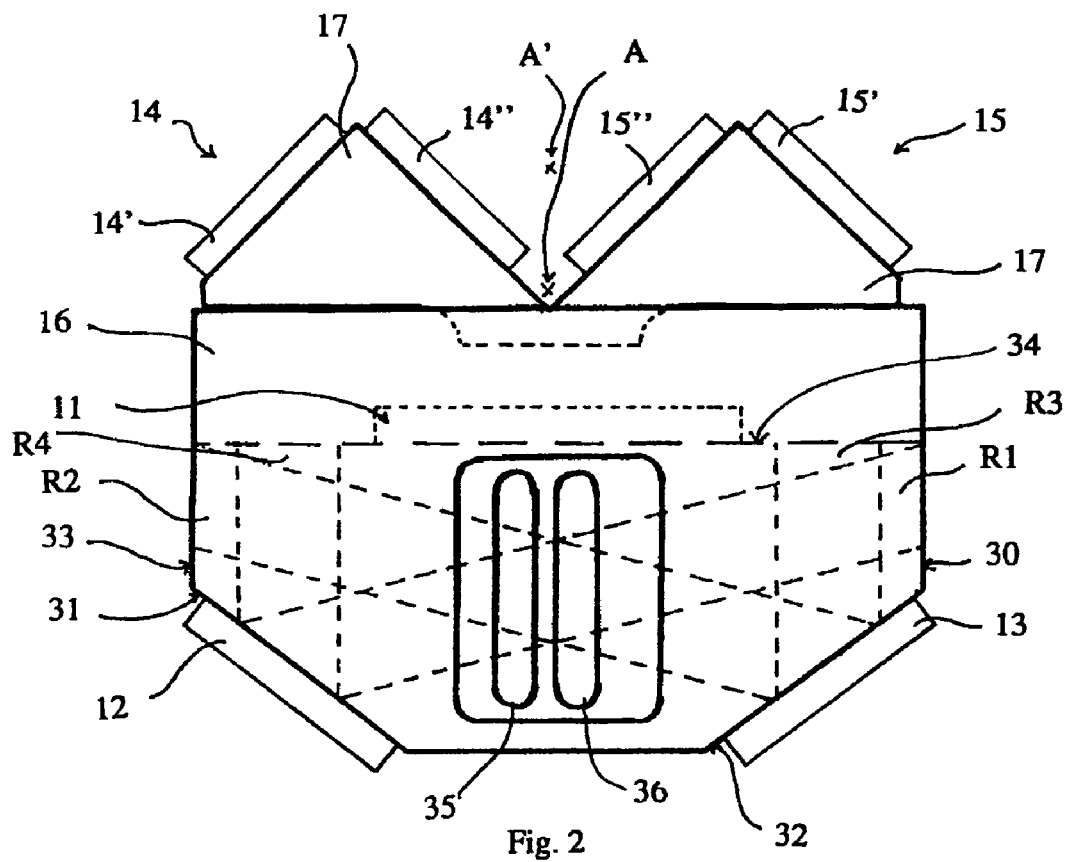
FIG. 2 shows a schematic plan view of an interferometer provided with the optical layout of FIG. 1.
Figure 3:
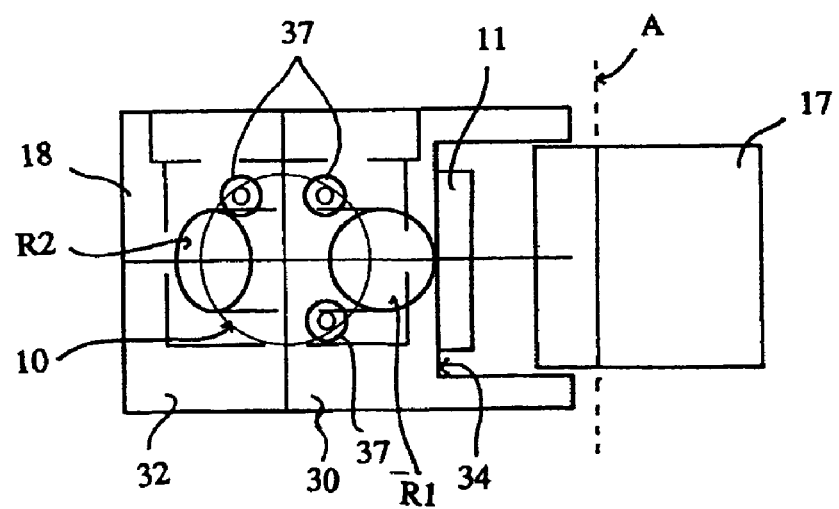
FIG. 3 shows a side view of an interferometer provided with the optical layout of FIG. 1.

The beamsplitter 10, the plane mirrors 12 and 13, as well as the end mirror 11 are mounted on a first rigid support structure 16 (see FIGS. 2 and 3). The angle mirrors 14 and 15 are mounted on a second rigid structure 17 (see FIGS. 2 and 3). The second rigid structure is adapted to be rotatable around a rotation axis A, whereby an optical distance traveled by the beams S2 and S3 can be changed by varying a position or rotational angle of the second rigid structure around the axis. In this context, the rotation axis A refers either to a physical element or its anticipated extension or to a conceivable line, about and/or around which the second rigid element is rotatable. An exemplary solution regarding a position of the rotation axis A is illustrated more accurately in FIG. 3. The beamsplitter 10 may include a compensation panel or, if necessary, the interferometer can be provided with a separate compensation panel.

The angle mirror 14, constituted by the plane mirrors 14' and 14", deflects the course of the beam S3 substantially by 180°, i.e. the angle mirror 14 reverses the course of the beam S3, yet in a laterally offset position. Respectively, the angle mirror 15, constituted by the plane mirrors 15' and 15", deflects the course of the beam S2 substantially by 180°, i.e. the angle mirror 15 reverses the course of the beam S2, yet in a laterally offset position. The plane mirrors 12 and 13, directing the beams S2 and S3, are adjusted in such a way that the beams S2 and S3 hit the end mirror 11 perpendicularly, i.e. such that the beams S2 and S3, reflecting from the plane mirrors 12 and 13 to the angle mirrors 14 and 15, are perpendicular to the plane of the end mirror 11. The described setup and configuration of mirrors provides the advantage that a reversal of the beams S2 and S3 always retains the same direction, even if the rotation axis A were to tilt off the exact vertical plane. Moreover, with the exception of strains caused by torsional forces, the above arrangement also tolerates practically all other deformations in the base of an interferometer. Thus, since, according to the present invention, the beams travel to and from movably mounted mirrors at an equal and substantially unchanging angle, the result will be an extremely stable structure.

An optical path difference x between the beams S2 and S3 is highly linear in an interferometer according to the invention. As stated above, the optical path difference x of the beams S2 and S3 changes as the angle mirrors mounted on the second rigid structure are rotated around the rotation axis A. Hence, the optical path difference x changes as a function of a rotational angle a, such that $x=8La$. Thus, the optical path difference between the beams changes quickly in proportion to a shift in the rotational angle of the movably mounted mirrors. Furthermore, in the inventive solution, a change of the optical path difference with an equal shift in the rotational angle exceeds that obtained for example in the interferometer disclosed in the patent publication U.S. Pat. No. 6,075,598.

In a carousel interferometer, modulation generally declines as a function of the rotational angle a, which in practice limits the resolution attainable with a carousel interferometer. The decrease in modulation is proportional to a factor $(aF)^2$, wherein F represents an angle between beams incident on the movably mounted mirrors and beams reflected therefrom. Since, in a solution of the present invention, the angle between a beam going to and a beam coming from the movably mounted mirrors in a highly preferred exemplary embodiment is substantially 180°, the angle F~0. Thus, in an interferometer of the present invention, the fall of modulation is substantially less than for example in the interferometer disclosed in the patent publication U.S. Pat. No. 6,075,598, in which the angle F is typically more than 30 degrees.

Thus, the stability of the interferometer according to the invention is the better the closer the angle between a beam going to and a beam reflected from the angle mirror is to 180°. However, for reasons relating to manufacturing techniques, it is not always possible to attain an absolutely perfect 180-degree angle. Moreover, there are applications that do not necessitate such a high stability, whereby the inventive interferometer can also be manufactured, for example in view of reducing the size of an interferometer, in such a way that there is an angle of 145°-215° between a beam going to and a beam reflected from the angle mirrors. In this case, the angle between plane mirrors constituting the angle mirror is about 72-107 degrees. In some applications for an interferometer of the invention, the angle between plane mirrors is 80-100 degrees, while in other applications it could be 85-95 degrees. The size of an angle between plane mirrors depends e.g. on stability required in a particular application and the size and shape requirements of a particular interferometer.

As for the plane mirrors 12 and 13, at least one is made adjustable. Thus, the angle mirrors 14 and 15 used in an interferometer can be fabricated in a substantially right angle design even prior to assembling the interferometer. After the interferometer has been assembled, it is sufficient that the orientation of an adjustable plane mirror be such that the direction of a beam reflected thereby is perpendicular to the plane of the end mirror 11. The interferometer is preferably provided with adjusters (not shown in the figures) for changing the attitude of an adjustable plane mirror/mirrors. The adjustment of an interferometer can also be effected by providing the interferometer with adjusters for controlling the attitude of a beamsplitter. If an interferometer is provided with means for controlling the attitude of a beamsplitter, the plane mirrors 12 and/or 13 need not necessarily be made adjustable.

Hence, varying the optical path difference x is performed by turning and/or rotating a carousel constituted by the angle mirrors 14 and 15 around the axis A. Thus, the optical path for the first beam S2 increases and the optical path for the second beam S3 decreases or vice versa, respectively. Since the plane mirrors, which constitute an angle mirror, remain fixedly and precisely at a right angle relative to each other, it is always by the same 180° that the angle mirror reverses the course of a beam incident thereon. That way, the beams always arrive in a substantially perpendicular direction at the end mirror 11 and always reflect back to return on the same path. In addition, since the only components rotated in an interferometer of the present invention are angle mirrors, the beams do not practically shift at all on any mirror in the interferometer. By virtue of this, the inventive interferometer has its resolution improved even further.

FIGS. 2 and 3 illustrate schematically one implementation for an interferometer comprising the optical layout of FIG. 1. The numbering of FIG. 1 is applied in the figure as appropriate. FIG. 2 shows the interferometer in a plan view, with necessary mirrors mounted thereon. FIG. 3 shows the interferometer in a side view, the only visualized optical elements being a beamsplitter and an end mirror. As shown in FIGS. 2 and 3, a first rigid member 16 is fitted with a beamsplitter 10 and an end mirror 11. In addition, the figure indicates schematically the position of plane mirrors 12 and 13 as mounted on the first rigid member 16. Attachment of the end mirror 11 in the proximity of the beamsplitter 10 provides a possibility of creating a major optical path difference. As the beamsplitter 10 and the end mirror 11 are attached to the same rigid member 16, the result will be a structure with a very high stability, in which the operation of the interferometer is not affected by potential deformations in a base plate (not shown in the figure) possibly present underneath the first rigid member 16.

FIGS. 2 and 3 show additionally a second rigid member 17 on which the angle mirrors 14 and 15 are mounted. As shown in the figure, the second rigid member 17 is mounted on the first rigid member 16 rotatably relative thereto, the second rigid member, and consequently the angle mirrors 14 and 15, being pivotable around a rotation axis A. The rotation axis can also be set in a position A' for attaining a larger optical path difference by a smaller rotational motion. Mounting the second rigid member 17 on the first rigid member 16 can be effected, for example, by using hinge pins or some other appropriate means known as such to a person skilled in the art. The second rigid member 17 can also be mounted rotatably on some element other than the first rigid member 16, for example on the base plate of an interferometer. When the second rigid member 17 is attached to the first rigid member 16, a separate base plate is not necessarily required for the interferometer but, instead, the interferometer can be directly attached to the base plate of a more extensive instrument assembly, such as a spectrometer, for example.

As shown in FIGS. 2 and 3, the first rigid member 16 is made from a single element of aluminium by machining, for example by drilling passages inside the element necessary for beams. Passages or routes R1-R4, provided for beams inside the first rigid member 16, are depicted in dashed lines. The route R1 is adapted to extend from the first straight side surface 30 of the interferometer to the second inclined side surface 31 of the rigid member, the surface having a plane mirror 12 attached thereto. The route R1 provides a passage for delivering the beam S1 shown in FIG. 1 inside the interferometer. The route R2 is arranged to extend from the first inclined side surface 32 of the rigid member 16, which surface has a plane mirror 13 attached thereto, to its second straight side surface 33. The route R2 provides a passage for discharging a beam brought inside the interferometer. The route R3 is arranged to extend from the first inclined side surface 32 to the front surface 34 of the interferometer. Respectively, the route R4 is adapted to extend from the second inclined side surface 31 to the front surface 34 of the interferometer. The routes R3 and R4 provide passages for beams from the plane mirrors 12 and 13 to the angle mirrors 14 and 15 and back. The routes R1-R4 all lie in a substantially common plane. The routes R1 and R2 cross over each other at the beamsplitter. As shown in FIG. 2, the first rigid member is provided with slots 35 and 36, through which a beamsplitter and a compensation panel can be fitted inside the interferometer. If a compensation panel is not desired in the interferometer or if the latter is provided with a beamsplitter, having a compensation panel integrated therewith, there is no compelling need for two slots.

The second rigid member 17 is also made from a single element of aluminium by machining routes or passages inside the element necessary for beams (not shown in the figure), said routes providing passages for beams to plane mirrors 14' and 14" as well as 15' and 15", from there to the end mirror and back by way of the above-described routes R3 and R4. The material used for manufacturing the first and second rigid members can also be other than aluminium. Moreover, the first and second rigid members can be made of different materials.

FIG. 3 further illustrates bores 37, whereby a beamsplitter and a compensation panel can be fitted in the slots 35 and 36 shown in FIG. 2. When the attachment of a beamsplitter and a compensation panel is effected with adjustable screws, the adjustment of an interferometer can be carried out by means of said screws. In this case, the plane mirrors 12 and 13 can be secured to the first rigid member in a fixed manner.

Figure 4:
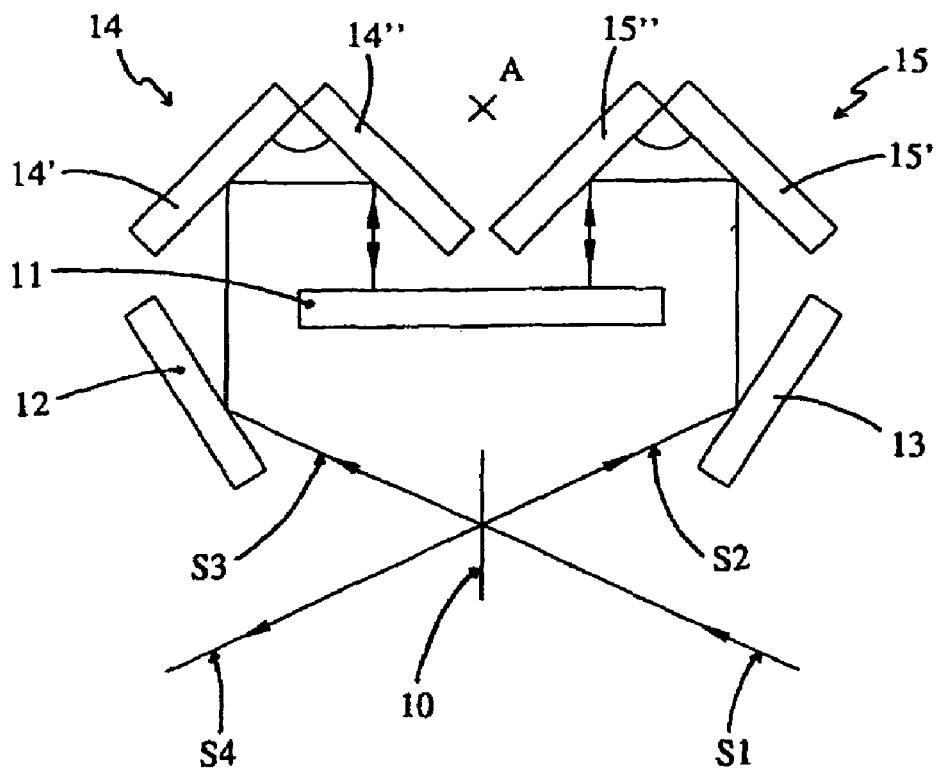
FIG. 4 shows schematically an optical layout for an interferometer according to another embodiment of the invention.

FIG. 4 illustrates schematically a second embodiment for the optical layout of an interferometer of the present invention. The numbering of FIG. 1 is applied in the FIG. 4 as appropriate. In the illustrated embodiment, the optical layout of an interferometer has been modified with respect to FIG. 1, such that a beam S1 to be conducted to the interferometer is brought to a beamsplitter 10 through between the beamsplitter 10 and a plane mirror 13. From the beamsplitter 10 the beam, which has split into beams S2 and S3, advances as shown in FIG. 1 by way of plane mirrors 12 and 13 and angle mirrors 14 and 15 to an end mirror 11, from which the beams return over the same route to the beamsplitter which combines the beams S2 and S3 for a single beam S4. The combined beam S4 is directed towards an interspace between the beamsplitter 10 and the plane mirror 12.

By no means is the invention limited only to the embodiment set forth in the preceding description, but it can be varied within the scope of an inventive concept as defined in the claims. For example, the attitude of the plane mirrors 12 and 13 and the attitude of a beamsplitter and an end mirror, as shown in the embodiments by way of example, can be varied. It is essential that the beams incident on the end mirror hit the latter from the angle mirrors in a substantially perpendicular fashion.

I claim:

1. An interferometer for analyzing a radiation beam, the interferometer comprising:

a rigid frame structured to rotate about an axis;

a beam splitter structured and disposed to reflect a first portion of the beam and to pass a second portion of the beam;

a first planar mirror disposed to reflect said first portion of the beam after reflection from said beam splitter;

a first angular mirror disposed and structured to reflect said first portion of the beam after reflection from said first planar mirror;

a first end mirror segment structured and disposed to reflect said first portion of the beam following reflection from said first angular mirror, wherein said beam splitter, said first planar mirror, said first angular mirror and said first end mirror segment communicate to pass said first portion of the beam back to said beam splitter following reflection from said first end mirror segment;

a second planar mirror disposed to reflect said second portion of the beam after passage through said beam splitter, a second angular mirror disposed and structured to reflect said second portion of the beam after reflection from said second planar mirror; and a second end mirror segment structured and disposed to reflect said second portion of the beam following reflection from said second angular mirror, wherein said beam splitter, said second planar mirror, said second angular mirror and said second end mirror segment communicate to pass said second portion of the beam back to said beam splitter following reflection from said second end mirror segment, wherein at least one of said first planar mirror, said first angular mirror said second planar mirror, and said second angular mirror are mounted to said rigid frame, wherein said rigid frame comprises a first rigid structure and a second rigid structure, wherein said beam splitter, said first planar mirror, and said second planar mirror are mounted on said first rigid structure, and said first and said second angular mirrors are mounted on said second rigid structure wherein said second rigid structure is constructed to rotate about said axis.

2. The interferometer of claim 1, wherein said first and said second angular mirrors are structured to reflect said first and said second portions of the beam through an angle which is substantially 180° or through an angular range which is one of between 45° to 215° and between 170° to 190°.

3. The interferometer of claim 1, wherein at least one of said first and said second angular mirrors directs a respective first and/or second portion of the beam towards said first and/or second end mirror segment in a direction substantially perpendicular thereto.

4. The interferometer of claim 1, wherein at least one of said first and said second angular mirrors consists essentially of two planar mirrors spanning an angle of about 72-107 degrees.

5. The interferometer of claim 4, wherein said angle is between 85° and 95° degrees.

6. The interferometer of claim 5, wherein said angle is approximately 90° degrees.

7. The interferometer of claim 1, wherein said second rigid structure is mounted on said first rigid structure to rotate relative thereto.

8. The Interferometer of claim 1, wherein said first and said second planar mirrors are disposed such that said first and said second beam portions are incident on said first and said second end mirror segments substantially perpendicular thereto and return to said beam splitter over a substantially same optical path through which they were incident on said first and said second end mirror segments.

9. The interferometer of claim 1, wherein each of said first and said second end mirror segments are disposed substantially at right angles with respect to said beam splitter.

10. The interferometer of claim 1, wherein in at least one of said first and said second planar mirrors is movable for adjusting the interferometer.

11. The interferometer of claim 1, further comprising at least one of a rotation mechanism for rotating said second rigid structure, a light source, and a receiver.

12. The interferometer claim 1, wherein said first and said second planar mirror are mounted on an outer surface of said first rigid structure and said first and said second angular mirrors are mounted to an outer surface of said second rigid structure.

13. An interferometer for analyzing a radiation beam, the interferometer comprising:

a rigid frame structured to rotate about an axis; a beam splitter structured and disposed to reflect a first portion of the beam and to pass a second portion of the beam;

a first planar mirror disposed to reflect said first portion of the beam after reflection from said beam splitter;

a first angular mirror disposed and structured to reflect said first portion of the beam after reflection from said first planar mirror;

a first end mirror segment structured and disposed to reflect said first portion of the beam following reflection from said first angular mirror, wherein said beam splitter, said first planar mirror, said first angular mirror and said first end mirror segment communicate to pass said first portion of the beam back to said beam splitter following reflection from said first end mirror segment;

a second planar mirror disposed to reflect said second portion of the beam after passage through said beam splitter, a second angular mirror disposed and structured to reflect said second portion of the beam after reflection from said second planar mirror; and a second end mirror segment structured and disposed to reflect said second portion of the beam following reflection from said second angular mirror, wherein said beam splitter, said second planar mirror, said second angular mirror and said second end mirror segment communicate to pass said second portion of the beam back to said beam splitter following reflection from said second end mirror segment, wherein at least one of said first planar mirror, said first angular mirror said second planar mirror, and said second angular mirror are mounted to said rigid frame, wherein said first and said second end mirror segments constitute portions of a single continuous planar mirror which is arranged to function as a common mirror for both said first and said second beam portions.

14. An interferometer for analyzing a radiation beam, the interferometer comprising:
   a rigid frame structured to rotate about an axis;
   a beam splitter structured and disposed to reflect a first portion of the beam and to pass a second portion of the beam;
   a first planar mirror disposed to reflect said first portion of the beam after reflection from said beam splitter;
   a first angular mirror disposed and structured to reflect said first portion of the beam after reflection from said first planar mirror;
   a first end mirror segment structured and disposed to reflect said first portion of the beam following reflection from said first angular mirror, wherein said beam splitter, said first planar mirror, said first angular mirror and said first end mirror segment communicate to pass said first portion of the beam back to said beam splitter following reflection from said first end mirror segment;
   a second planar mirror disposed to reflect said second portion of the beam after passage through said beam splitter, a second angular mirror disposed and structured to reflect said second portion of the beam after reflection from said second planar mirror; and
   a second end mirror segment structured and disposed to reflect said second portion of the beam following reflection from said second angular mirror, wherein said beam splitter, said second planar mirror, said second angular mirror and said second end mirror segment communicate to pass said second portion of the beam back to said beam splitter following reflection from said second end mirror segment, wherein at least one of said first planar mirror, said first angular mirror said second planar mirror, and said second angular mirror are mounted to said rigid frame, wherein the radiation beam passes into the interferometer and onto the beam splitter after passing between said first planar mirror and said first angular mirror, wherein said first beam portion is reflected from said beam splitter to said first planar mirror and is perpendicularly reflected from said first planar mirror past said beam splitter and onto said first angular mirror before passing to said first end mirror segment and then returns from said first end mirror segment, over a same first path, back to said beam splitter, wherein said second beam portion passes from said beam splitter to said second planar mirror to be reflected therefrom and pass by the beam splitter to the second angular mirror, and then to said second end mirror segment, and returns from said second end mirror segment to said beam splitter over a same second path, wherein said beam splitter combines said first and second beam portions returning from said first and said second end mirror segments into a single output beam and directs said single output beam towards a gap between said second planar mirror and said second angular mirror.

* * * * *